April 1, 1969  G. C. WRIGHT ET AL  3,435,693
BELT TRACKING DEVICE

Filed Oct. 27, 1966

INVENTOR.
GERARD C. WRIGHT
WILLIAM L. TAYLOR
BY
ATTORNEYS

INVENTOR.
GERARD C. WRIGHT
WILLIAM L. TAYLOR
ATTORNEYS

United States Patent Office 3,435,693
Patented Apr. 1, 1969

3,435,693
BELT TRACKING DEVICE
Gerard C. Wright, Penfield, and William L. Taylor, Newark, N.Y., assignors to Xerox Corporation, Rochester, N.Y., a corporation of New York
Filed Oct. 27, 1966, Ser. No. 589,999
Int. Cl. F16h 7/18
U.S. Cl. 74—241                                                6 Claims

ABSTRACT OF THE DISCLOSURE

There is disclosed herein apparatus for maintaining transverse alignment of a moving belt by having a sensing member adjacent to the edge of the belt which is moved by the belt and a linkage member which translates the movement of the sensing member into movement of the axis of the rollers supporting the belt.

This invention relates generally to belt tracking apparatus and more particularly to apparatus for maintaining the transverse alignment of a moving belt member passing over a series of roller members.

When wide, thin, or flexible belts are passed around a series of rollers there is a tendency for the belt to drift or move laterally from one side to the other. Movement of this type if left uncorrected will eventually carry the belts off the rollers. This movement or drift of the belts across the rollers has produced many proposed solutions. The lateral movement affects both the operation and the wearing characteristics of the belts and the rollers and limits the different applications to which wide flexible belts may be used. For example, the belt shown herein is a flexible brass belt containing a layer of photoconductive material such as selenium for use in office copying machines electrostatic images of copies to be reproduced are optically produced on the surface of the belt and are developed thereon with a powder which is subsequently transferred to a final copy sheet. The alignment of the original image on the belt and its subsequent transfer to a copy sheet are critical and must be controlled within prescribed tolerances. Therefore the lateral movement of the belt itself is critical and the problem of tracking the belt assumes proportions not generally found in the normal belt tracking situations.

If belts were perfectly constructed, that is if they were absolutely identical at every point across the circumference of the belt, and if these belts were operated with perfectly cylindrical rolls which were mounted and secured in exact parallel relation there would be no difficulty in controlling the lateral side position of the belt. However, this is not practical in actual operation. The belts must be tracked or controlled to regulate their lateral position. Existing methods of controlling the lateral movement or tracking the belts consists of various forms of crowned rolls, flanged rolls, and electrical servo systems. Crowned rollers work fairly well with rigid rolls and resilient belts. When the belt is rigid high tensions are required to effect tracking with crowned rolls and the high tension produces high local stresses at the crown of the roll resulting in belt damage. Flanged rolls produce concentrated loading at the edge of the belts resulting in excessive wear, edge buckling and seam splitting. Electrical servo mechanisms are expensive and elaborate. They require microswitches which sence the edge of the belt and detect any movement in the belt, and motors which drive the rollers to counteract the movement of the belt. They also have a tendency to keep the belt moving laterally back and forth as it contacts the sensing device producing a constant movement. The present invention requires no crowning or flanging of the rollers and requires no elaborate microswitching or motor driving mechanisms. It utilizes forces which allow the belt to stabilize itself and the roller system through the action of a mechanical linkage which is actuated by the edge of the belt.

It is therefore the primary object of this invention to track belts while they are being driven about a series of rolls.

It is also an object of this invention to maintain lateral alignment of a belt on a series of rolls.

It is also an object of this invention to control the drift of a belt moving about a series of rolls to keep the belt aligned within prescribed tolerances.

It is also an object of this invention to provide an apparatus for belt tracking utilizing only mechanical linkage.

These and other objects of this invention are obtained by means of a system of rollers the axis of one or more of which may be varied in response to small movements of the edge of the belt on the rolls by a servo system resulting in changes in the angle of approach of the belt to the rolls.

For a better understanding of the invention as well as other objects and further features thereof, reference is had to the following detailed description of the invention to be read in connection with the accompanying drawings wherein.

Figure 2:
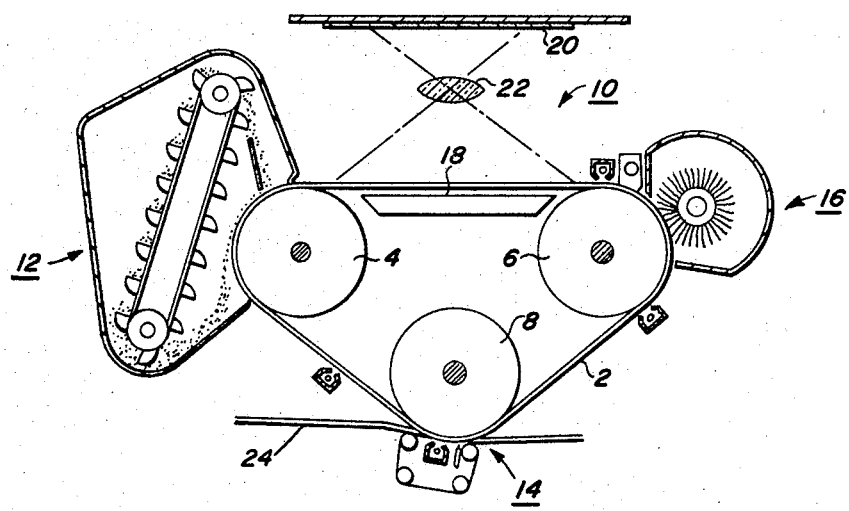
FIG. 2 is a schematic arrangement of a xerographic belt system showing various xerographic process stations.

For purposes of illustrating the invention a wide flexible belt of the type used in xerographic reproducing machines is used herein. FIG. 2 shows a schematic representation of the processing stations of such a machine. It is to be understood that the xerographic application of the invention is for illustrative purposes only. The principles involved herein are equally applicable to belt conveyors and other types of devices using large wide flexible belts. The purpose of using the xerographic application is to select an embodiment wherein the lateral position of the belt on the rollers is critical for alignment purposes. As can be seen in FIG. 2 a belt 2 is positioned around a series of rollers 4, 6, and 8. The belt is driven around these rollers past an exposure station 10, a developing station 12, transfer station 14, and a cleaning station 16. At the exposure station 10 the belt is held in a flat position by a vacuum platen 18 and is exposed to an optical image of an original copy 20 through a lens 22. The main reason for using a flexible belt in this type of application is that the exposure takes place on a flat surface giving the optical properties of a flat plate. In conventional xerographic machines the exposure is a scanning type of exposure on the surface of a xerographic drum. The optical qualities associated with full frame exposure on a flat surface are superior to those of scanning on a moving drum. The flexible belt can then be fed around rollers and through various processing stations thus combining the efficiency of continuous processing with the optical quality of full frame exposure. However, with this type of device there comes the necessity to maintain accurate alignment between the electrostatic image produced at exposure station 10 and the positioning of a developed image on a support sheet 24 at transfer station 14. Drift or lateral movement of the belt between the exposure station or the transfer station will result in copy being improperly positioned on the support sheet 24.

Figure 3:
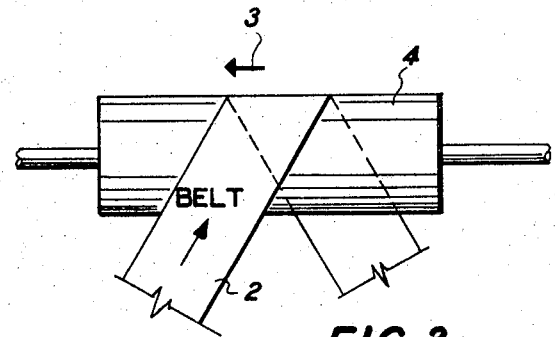
FIG. 3 is a schematic representation of a belt and roller illustrating belt tracking principles.
Figure 4:
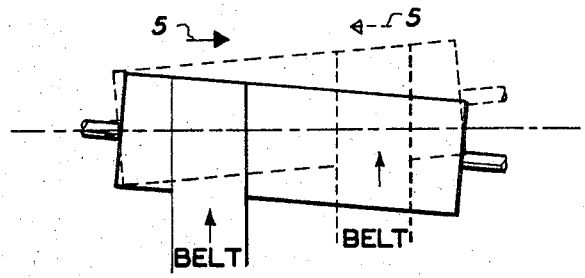
FIG. 4 is a schematic representation of a belt and roller illustrating a belt tracking principle.

FIGURES 3 and 4 illustrate the principle of belt wrap on a roller which produces lateral movement or drift of the belt along the roller. If the axis of the roller and the surface of the roller were exactly parallel and the belt approached the roller at right angles to the axis then each successive point on the belt would contact the roller at the same relative position, that is, the plane having all points of contact would be perpendicular to the axis of the roller. However, in normal operation either the surface of the roller has worn so that it is not exactly parallel to the axis of the roller, or the belt does not approach the roller exactly perpendicular to the surface of the roller and thus the belt does not contact the surface of the roller at the same relative position for each succeeding point. As can be seen in FIG. 3 when a belt 2 approaches a roller 4 at an angle, each incremental area of the belt comes into contact with a different lateral point along the surface of the roller. Each succeeding point is a little further along in the direction indicated by the arrow 3, and unless there is relative movement between the belt and the roller the belt will tend to move along the roller in the direction indicated by the arrow 3. This movement though exaggerated in FIG. 3 is produced by any variation in the angle at which the belt approaches the roller.

The very same result can be produced by varying the position of the roller axis rather than the angle of approach of the belt. As shown in FIG. 4 the angle between the belt and the surface of the roller can be varied by moving the axis of the roller in either direction thus producing the movement in the direction of the arrows 5 in the same manner as described above. It can be seen from FIG. 4 that a change in the angle of the roller axis relative to the belt produces a corresponding movement or drift of the belt along the surface of the roller. By adjusting the position of the axis the belt may be tracked along the roller so that the drift or lateral movement is kept to a minimum.

Figure 1:
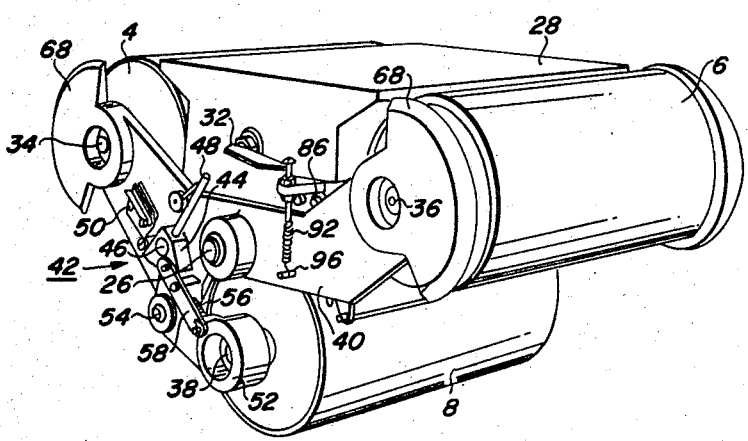
FIG. 1 is a perspective view of a roller system embodying the present invention.
Figure 5:
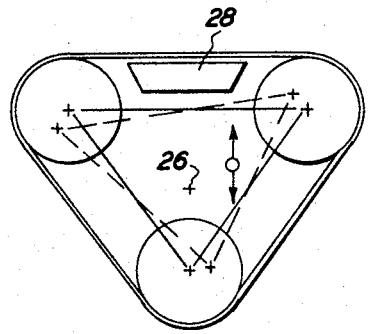
FIG. 5 is a schematic representation of a belt and roller system illustrating the movement of the centers of the roller.
Figure 6:
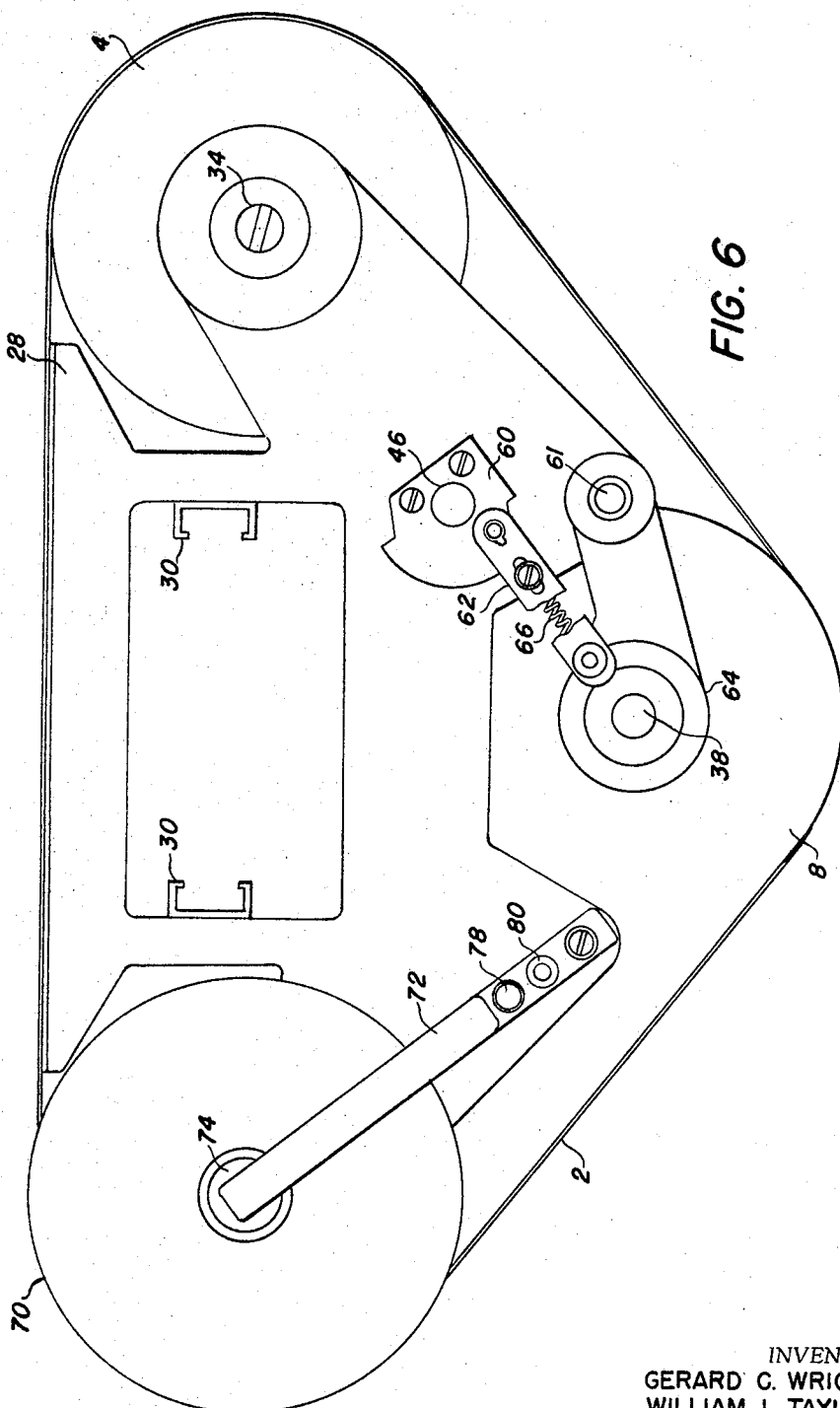
FIG. 6 is a rear view of the apparatus shown in FIG. 1.

The amount of movement of the belt for slight variations in the angle of the roller axis is also dependent upon the degree of wrap or contact that the belt has with the roller. The larger the degree of wrap or contact the larger the amount of movement. In a two roller, three roller, or multiple roller system any one or all of the rollers may be moved to produce belt tracking. However, the larger the number of rollers moved the smaller the actual movement of the axis is required to produce corresponding movement of the belt. For purposes of disclosure herein, a three roller system is shown in FIGS. 1 and 6. The invention, however, is equally applicable to two roller systems or systems utilizing larger number of rollers. FIG. 5 shows the mechanics of the operation of a three roller system. If it is assumed that one end of each of the three rollers is journaled in fixed relation to each other in a plate which is pivotable about a point 26 then the belt may be tracked or moved by moving the axis of the rollers between the position indicated in the solid line at the position indicated in the dotted line.

In FIG. 1 the point about which the axis of the three rollers are rotated is a shaft indicated by numeral 26. The shaft 26 is mounted in a main frame 28 which herein is the rigid support for the entire system and also serves the purpose of a platen for the belt at exposure station 10. The main frame 28 is intended to be mounted in a machine by means of the channel slide numbers 30 and is intended to be secured in a fixed or rigid position by means of a quarter turn type lock 32. Each of the rollers 4, 6, and 8 is mounted on a shaft 34, 36, and 38 respectively. The inboard ends of the shafts 34, 36, and 38 are journaled in the main frame 28.

At the outboard end of the rollers there is a frame member 40 suspended from and rotatable about the shaft 26. The outboard ends of the roller shafts 34, 36, and 38 are journaled in the outboard frame 40. Thus the entire assembly is supported from the main frame 28 and the outboard ends of the rollers are pivotable about the point 26.

The roller 8 is a belt tensioning roller and may be raised and lowered by means of an eccentric type latch 42 to permit a continuous loop belt to be placed on or off the rollers. The latch mechanism consists of an eccentric block 44 pivotable about a pin 46 and having an arm 48 which may be held in a latch 50 to hold the roller in an elevated position. The shaft 38 of the tensioning roller 8 is mounted in a bearing support 52 which is pivotably secured to the frame 40 by pin 54. The bearing support 52 is urged downward by a compression spring 56 and is connected to the eccentric block 44 by means of an arm 58. Movement of the arm 48 towards the latch 50 causes the eccentric block 44 to rotate about the pin 46 releasing the spring 56 and moving the arm 58 and the bearing support 52 upward. On the inboard end as seen in FIG. 6 the pin 46 extends through the main frame 28 and is connected to another eccentric block 60, arm 62, and bearing support 64 to produce identical movement of the shaft 38 about pin 61 against the action of a second compression spring 66.

When a belt is replaced around the rollers, the latch 42 is actuated to raise the roller 8 against the action of the springs 56 and 66 and the belt is placed on the rollers with the aid of the chamfered portions 68 of the frame 40. With the belt in position the latch 42 is released and tension is applied to the belt through the roller 8. The drive forces to move the belt may be supplied through either the roller 4 or 6 through any normal drive system not shown herein.

Figure 7:
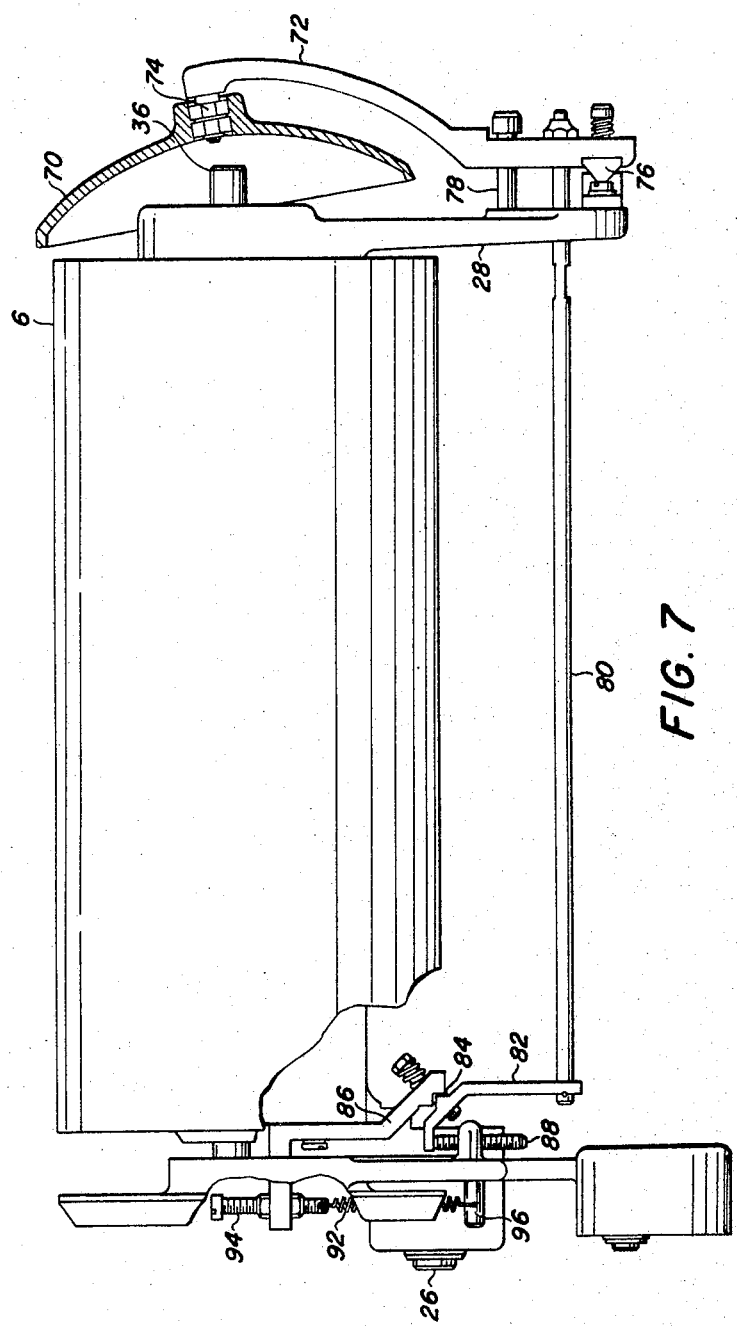
FIG. 7 is a side view of the apparatus shown in FIG. 1 with a roller removed and portion broken away to show hidden parts.

The tracking mechanism consists of a sensing member 70, shown herein as a bell shaped member, and an actuating arm 72 on which the sensing member rotates. The purpose of the member 70 is to pivot an arm 72 in response to lateral movement of the belt. The member 70 rotates about a bearing 74 on the arm 72 with the movement of the belt. Thus there should be little or no friction between the belt and the rotatable member 70. As the belt moves or tracks towards the sensing member 70 the belt tends to force the sensing member 70 to the right as seen in FIG. 7. Movement of the sensing member 70 causes the arm 72 to pivot about a knife edge pivot point 76. Movement of the arm 72 is guided by a pin member 78 secured in the main frame 28. The movement of the arm 72 produces corresponding movement in a rod 80 which is connected to an arm 82. The arm 82 pivots about a pivot point 84 in a bracket member 86. The bracket 86 is secured to the main frame 28. The arm 82 translates the movement of the rod 80 into rotational movement of the frame 40 about the point 26. The arm 82 pivots about point 84 and bears downward on an adjustable set screw 88 mounted in the frame 40. When the sensing member 70 is moved away from the roller or to the right as seen in FIG. 7, the arm 72 pivots about point 76 drawing the rod 80 to the right. The rod 80 in turn pivots the arm 82 about the point 84 forcing the end of the arm 82 downward against the set screw 88 forcing the frame 40 to rotate in a clockwise direction as seen in FIG. 1. The frame 40 is biased in a counter clockwise direction by means of a tension spring 92 secured between a set screw 94 mounted in the bracket 86 on the main frame 28 and a pin 96 secured to the rotatable frame 40. The biasing of the frame 40 in a counter clockwise direction produces a non-alignment of the three rollers in a direction which would produce movement of the belt inward towards the sensing member 70. Thus when a new belt is placed on the rollers the action of the spring 92 to bias the frame 40 in a counterclockwise direction produces tracking of the belt toward the sensing member 70 and continues until the force of the belt against the sensing member 70 actuates the linkage described above to rotate the frame 40 in a clockwise direction. Rotating the frame slows down the amount of tracking of the belt until the belt stops tracking and remains at an equilibrium condition. If the belt is forced against the sensing member 70 the linkage tends to rotate the frame to a position where the belt will track away from the member 70 until equilibrium is reached. After equilibrium condition is reached the belt is held in contact with the sensing member 70 and properly aligned on the belt's roller system.

While the invention has been described with reference to the structure disclosed herein, it is not confined to the details set forth, and this application is intended to cover such modifications or changes as may come within the purposes of the improvements or the scope of the following claims.

What is claimed is:

1. Apparatus for maintaining the transverse alignment of a moving belt comprising,
    a plurality of rollers forming a path of movement for said belt,
    a first plate member having one end of said rollers rotatably mounted therein,
    a second plate member having the opposite ends of said rollers rotatably mounted therein,
    means rotatably mounting said second plate member with respect to said first plate member,
    sensing means mounted adjacent said path of movement and adapted for contact by said belt, and
    linkage means operatively connecting said second plate member and said sensing means and adapted when actuated to rotate said second plate member with respect to said first plate member.

2. The apparatus as defined in claim 1 wherein the sensing means includes a member rotatably mounted on an actuating arm forming part of the linkage means, said member being adapted to be rotated by contact with the edge of the belt to reduce friction between the belt and the member.

3. In combination with a moving belt, apparatus for maintaining said belt in transverse alignment with a desired path of travel, said apparatus comprising,
    a plurality of rollers forming a path of travel for said belt,
    a first support member having one end of said rollers rotatably mounted therein,
    a second support member having the opposite ends of said rollers rotatably mounted therein,
    pivot means rotatably mounting said second support member with respect to said first support member,
    means normally biasing said second support member in a direction about said pivot means to produce an initial transverse movement of said belt,
    sensing means adjacent said path of travel to be engaged by one edge of said belt upon said initial transverse movement thereby transversely displacing said sensing means, and
    mechanical linkage means operatively connecting said second support member and said sensing means for rotating said second support member away from said biased direction whereby said initial transverse movement of said belt is terminated.

4. Apparatus for imparting transverse alignment to a moving belt member comprising,
    a plurality of roller members for supporting said web along a path of travel,
    a first frame assembly having one end of said roller members rotatably journaled therein,
    a second frame assembly having the opposite ends of said roller members rotatably journaled therein,
    means pivotally supporting said second frame assembly relative to said first frame assembly, and
    means responsive to the transverse positioning of said web on said roller members to pivot said second frame assembly in relation to said first frame assembly.

5. Apparatus for maintaining transverse alignment of a moving belt member comprising,
    a plurality of roller members defining a path of travel along which said belt member is advanced,
    a first support member having one end of said roller members rotatably journaled therein,
    a second support member having the opposite ends of said roller members rotatably journaled therein,
    means for supporting said first and said second support members in relative pivotal relationship,
    means adjacent said path of travel for sensing the transverse positioning of said belt member on said roller members, and
    means responsive to said sensing means for changing the relative pivotal relationship between said first and said second support members to alter the alignment of said roller members supported therebetween and impart a correctional movement of said belt member on said roller members.

6. Apparatus for maintaining the transverse alignment of a moving belt member comprising,
    a plurality of roller members defining a path of travel along which said belt member is advanced,
    a first support member having one end of said roller members rotatably journaled therein,
    a second support member having the opposite ends of said roller members rotatably journaled therein,
    means for supporting said first and said second support members in relative pivotal relationship,
    means normally biasing at least one of said first and said second support members and the ends of said roller members journaled therein in a direction about said supporting means to produce a transverse movement in a predetermined direction of said belt member in relation to said roller members,
    means adjacent said path of travel to sense the transverse positioning of said belt member, and
    means responsive to said sensing means for producing a movement of at least one of said first and said second support members and the ends of said roller members journaled therein about said supporting means to produce a compensating transverse movement of said belt member in the direction opposite said predetermined direction.

References Cited

UNITED STATES PATENTS

| 1,842,946 | 1/1932 | Prins | 74—241 |
| 2,431,856 | 12/1947 | Ziegler | 74—241 XR |
| 2,662,767 | 12/1953 | Dourdeville | 74—241 XR |
| 2,988,141 | 6/1961 | Madden et al. | 74—241 XR |

FRED C. MATTERN, JR., *Primary Examiner.*

JAMES A. WONG, *Assistant Examiner.*

U.S. Cl. X.R.

198—202; 226—18, 23